United States Patent [19]

Nogami

[11] 4,050,744
[45] Sept. 27, 1977

[54] SAFETY DEVICE FOR USE IN A VEHICLE BRAKE

[75] Inventor: Tomoyuki Nogami, Toyota, Japan

[73] Assignee: Toyota Jidosha Kogyo Kabushiki Kaisha, Japan

[21] Appl. No.: 756,976

[22] Filed: Jan. 5, 1977

[30] Foreign Application Priority Data

Sept. 18, 1976 Japan .................................. 51-112098

[51] Int. Cl.² .......................... B60T 8/14; B60T 17/18
[52] U.S. Cl. ................................. 303/24 A; 303/6 C; 303/24 F; 303/84 A
[58] Field of Search .................. 188/151 A, 345, 349; 303/6 C, 24 A, 24 B, 24 F, 24 C, 84 A

[56] References Cited

U.S. PATENT DOCUMENTS

| 3,143,125 | 8/1964 | Stelzer | 303/6 C X |
| 3,252,740 | 5/1966 | Stelzer | 303/6 C |
| 3,900,840 | 8/1975 | Swanson | 303/6 C X |

Primary Examiner—George E. A. Halvosa
Attorney, Agent, or Firm—Browdy and Neimark

[57] ABSTRACT

A safety device for use in a hydraulic brake for vehicles, comprising a valve inserted in the hydraulic pressure circuit connecting a tandem type master cylinder for the vehicle hydraulic brake and the rear/front wheel cylinders. The valve comprises (a) a valve casing; (b) a ball containing chamber, formed in the valve casing, constituting a part of the hydraulic pressure circuit to the rear wheel cylinders; (c) a ball accommodated in the ball containing chamber, and rolling up along a slope due to inertia, when the deceleration rate of the vehicle exceeds a predetermined value, to closely contact to a valve seat for blocking the braking-fluid path to the rear brake circuit; (d) a differential piston containing chamber; and (e) a differential piston axially slidably fitted in the differential piston containing chamber and being, on either end surface, subjected to hydraulic pressure of the rear brake circuit and the front brake circuit, wherein when the former brake circuit is damaged it is slidden toward the ball, by virtue of the pressure difference between the two circuits, to press the ball against the valve seat, and when the latter circuit is damaged it is slidden in the reverse direction similarly due to the pressure difference to block the braking-fluid path to the front brake circuit.

10 Claims, 8 Drawing Figures

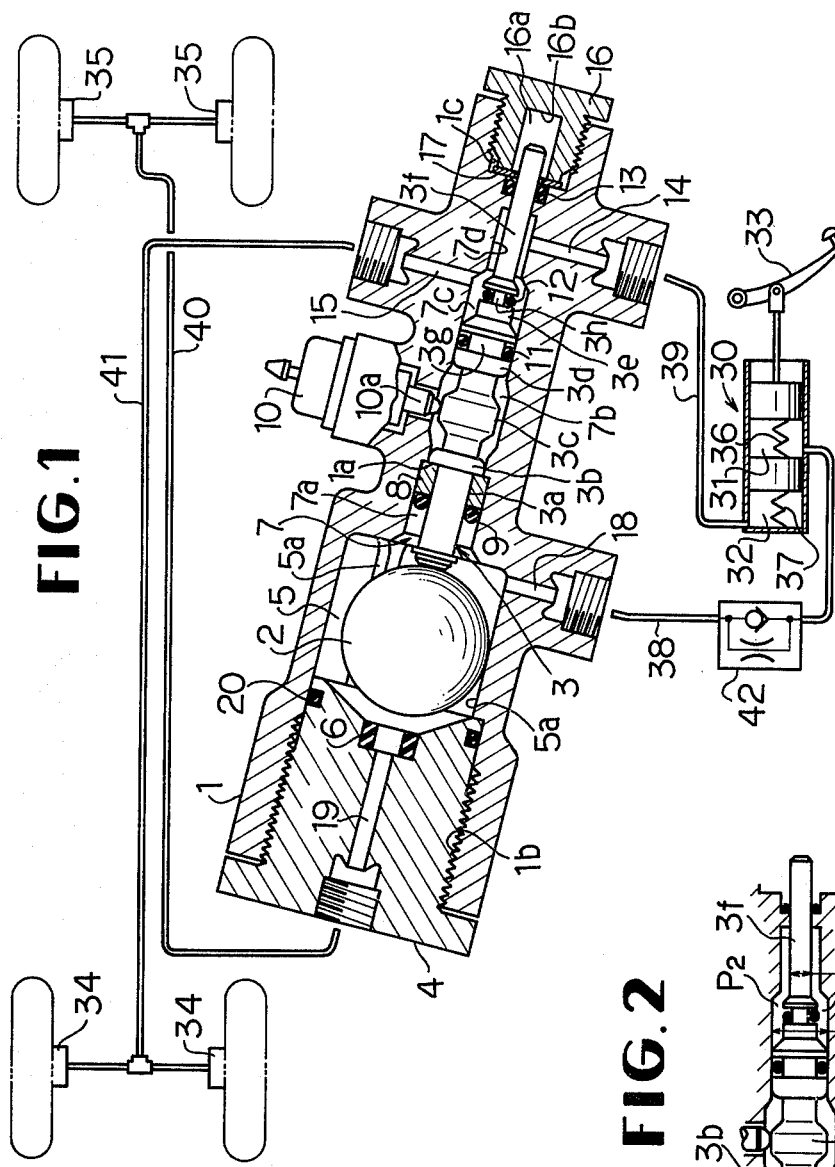
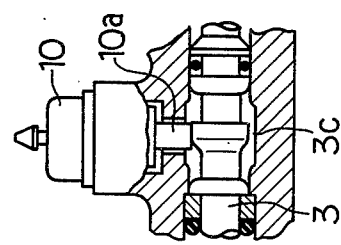
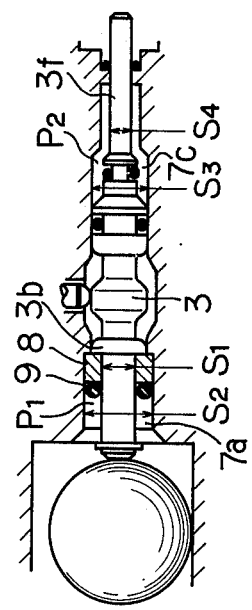

SAFETY DEVICE FOR USE IN A VEHICLE BRAKE

BACKGROUND OF THE PRESENT INVENTION

Upon applying the brake, locking of vehicle wheels is generally observed, which decreases the frictional force between the road surface and the tire to thereby diminish braking force and weaken directionality of the vehicle. Gravity value is known as a kind of anti-skidding device for preventing this phenomenon. This device decreases the tendency of rear-wheel locking caused by decreasing of load thereupon (nose diving), when the brake is applied, because of forward shifting of vehicle gravity due to inertia. The basic principle of the device resides in that a ball placed on a slope rolls up therealong by inertia, in case of brake applying, to shut off the path of braking-fluid to the rear brake. A few modifications of the device are known in U.S. Pat. Nos. 3,143,125 and 3,147,045 and others.

When a tandem cylinder is used as a master cylinder, in which a pair of pistons are fitted in series, for simultaneously producing two differently directed braking hydraulic forces, in case of a breakdown taking place in one of the two hydraulic circuits, hydraulic pressure in the other circuit will not rise enough before the braking-fluid in the damaged circuit is completely exhausted out therefrom. This causes the time for the entire stroke of the brake pedal to be longer than in normal condition, and in addition makes the stroke effective only at the final stage thereof, possibly incurring a great deal of danger.

The present invention is aimed at the provision of a safety device for use in a vehicle hydraulic brake having, with the object of eliminating such a danger, double functions as a gravity valve and as a differential valve with a shut-off valve, in which a differential piston is axially movably fitted within a valve casing, with the opposite end surfaces thereof receiving respectively the hydraulic pressure from each of the two circuits, to slide in the axial direction due to the pressure difference in the braking-fluid caused by the breakdown in any one of the hydraulic circuits for shutting off the path of the braking-fluid to the damaged circuit and alarming the driver of the breakdown or damage in the hydraulic brake system.

SUMMARY OF THE PRESENT INVENTION

This invention relates to a safety device for use in a vehicle hydraulic brake, more particularly, to a valve inserted in a hydraulic circuit interconnecting a tandem type master cylinder and the front/rear wheel cylinders, for improving the safety performance of the brake.

It is an object of this invention is provide a safety device for use in a vehicle hydraulic brake capable of eliminating the danger which has been thought inevitable to the conventional brake system, in such a way that the braking function is maintained, even if either front or rear hydraulic brake circuit be damaged, in the other undamaged circuit, by utilizing the gravity valve as a shut-off valve for the rear circuit.

It is another object of this invention to provide a safety device for use in a vehicle hydraulic brake with a simplified structure by concurrently giving the gravity valve function and the differential valve function in one integrated unit valve, which will lead to the reduction of manufacturing cost thereof.

It is another object of this invention to provide a safety device used in a vehicle hydraulic brake system effective in the reduction of manufacturing cost by minimizing the joint elements which would be needed in case of separate assembling of the gravity valve and the differential valve with a shut-off valve.

It is still another object of this invention to provide a safety device used in a vehicle hydraulic brake system aiming at decreasing the chance of fluid leakage by minimizing the number of joint elements, and also aiming at the reduction of the required space for the installation of the safety device for the same reason.

BRIEF DESCRIPTION OF THE DRAWING

FIG. 1 is a longitudinal vertical sectional view of an essential part in a first embodiment along with a brake system diagramatically illustrated;

FIG. 2 is a longitudinal sectional view for explaining the way of determining the dimensions of essential parts in the device shown in FIG. 1;

FIG. 3 is a vertical sectional view of an essential part of a second embodiment;

DETAILED DESCRIPTION OF THE PREFERRED EMBODIMENTS

Figure 4:
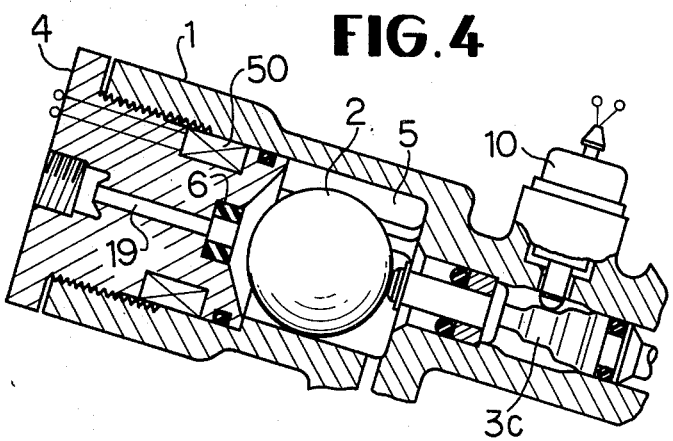
FIG. 4 is a vertical sectional view of an essential part of a third embodiment.

In order to clarify the abovementioned and other objects of the present invention along with the structure and effects thereof a few preferred embodiments will be described.

In FIG. 1, a ball 2 for sensing the deceleration rate and a differential piston 3 are accommodated in a valve casing 1. The ball 2 is disposed in a larger-diametered ball containing chamber 5 axially bored from one end of the valve casing 1, which chamber being provided with axial ribs 5a or ball guides, at least three equally spaced on the inner surface thereof. The ball 2 is retained by the ribs 5a of the ball containing chamber 5 in a manner being capable of rolling along the axis thereof. In the end opening of the ball containing chamber 5 is threaded a plug 4, which is provided with a through port 19 in the central portion thereof. In a recess formed at the ball side end of the plug 4 is rigidly fitted a valve seat 6. The ball containing chamber 5 is communicated with a port 18 through one side thereof. The numeral 20 represents a sealing ring keeping fluid tightness between the plug 4 and the valve casing 1.

A differential piston 3 is accommodated in a differential-piston-containing-chamber 7, which is axially bored with steps through the valve casing 1 and communicated with the ball-containing-chamber 5. The differential-piston-containing-chamber 7 is mainly composed of a first piston chamber 7a, a cam chamber 7b, a second piston chamber 7c, and a valve chamber 7d, all of which are tandemly arranged in this order from the ball side. The differential piston 3 is constructed of, in the order from the ball 2 side, a first piston 3a, a flange portion 3b, a cam portion 3c, a second piston portion 3d, a shut-off valve 3e, and a push-rod portion 3f.

On the first piston portion 3a, accommodated in the first piston containing chamber 7a, are fitted a movable ring 8 and a sealing ring 9. Although the movable ring 8 is axially shiftable relative to both the differential piston 3 and the valve casing 1, a rightward movement relative to the differential piston 3 in FIG. 1 is restricted by a flange portion 3b of the same and a rightward movement relative to the valve casing 1 is also restricted after the movable ring 8 has been fitted on the first piston portion 3a for keeping fluid tightness between the first piston portion 3a and the valve casing 1.

The cam portion 3c, disposed adjacent to the flange portion 3b and accommodated in the cam chamber 7b, is composed of central larger-diametered portion, a pair of smaller-diametered portions at opposite ends, and a pair of tapered portions steplessly connecting the larger-diametered portion and the smaller-diametered portions. On the cam portion 3c is contacting a plunger 10a of a switch 10 for an alarm means. In response to an axial movement of the differential piston 3 the switch 10 is actuated ON and OFF, the switch being of conventional type requiring no further explanation.

On the outer periphery of the second piston portion 3d accommodated in the second piston chamber 7c is formed a circumferential groove 3g, in which a sealing ring 11 is fitted for keeping fluid tightness between the second piston portion 3d and the valve casing 1.

On the outer periphery of the shut-off valve portion 3e, which is disposed adjacent to the second piston portion 3d and has a smaller diameter than that of the same, is formed a circumferential groove 3h, in which a sealing ring 12 is fitted. Although the shut-off valve 3e is located in the second piston chamber 7c while the brake system normally operates, it is adapted to be fitted into the valve chamber 7d having a smaller diameter than that of the second piston chamber 7c, in case of rightward shifting of the differential piston 3 in FIG. 1 due to a breakdown of the brake system on the front wheel side (front brake circuit), as will later be described, to shut off the path of braking-fluid leading from a port 14, via the valve chamber 7d and the second piston chamber 7c, to a port 15.

The push-rod portion 3f disposed adjacent to the shut-off valve portion 3e projects, through an end wall of the valve casing 1 on the right side in FIG. 1, into a plug fitting bore 1c formed at the end of the valve casing 1. Fluid tightness between the valve casing 1 and the push-rod portion 3f is retained by a sealing ring 13. In the plug fitting bore 1c is threaded a plug 16, in the center of which is formed a cavity 16a for receiving the projection of the push-rod portion 3f. The base 16b serves as a stopper for restricting the rightward movement of the differential piston 3. Numeral 17 represents a retaining plate for the sealing ring 13.

The differential piston 3 must be maintained at the neutral position shown in FIG. 1 while the brake system is normally operating. The following formula should be established therefor by so determining the sectional area of each portion as shown in FIG. 2, wherein:

$S_1$ is the sectional area of the first piston portion 3a;
$S_2$ is the sectional area of the first piston chamber 7a;
$S_3$ is the sectional area of the second piston chamber 7c;
$S_4$ is the sectional area of the push-rod portion 3f;
$P_1$ is the pressure in the first piston chamber 7a; and
$P_2$ is the pressure in the second piston chamber 7c;

$$S_2 \times P_1 < (S_3 - S_4) \times P_2 < S_1 \times P_1.$$

In other words the force for rightwardly shifting the differential piston 3, $S_1 \times P_1$ is less than the force for leftwardly shifting the same $(S_3 - S_4) \times P_2$, consequently the differential piston 3 being leftwardly biased to effect abutment of the flange portion 3b against the movable ring 8. In order to effect a leftward movement in FIG. 2 from its neutral position of the differential piston 3, it is naturally required to move together the movable ring 8 which is being urged against the stepped portion 1a on the right side by the sealing ring 9 under the pressure $P_1$ in the first piston chamber 7a. The force to leftwardly urge the differential piston, i.e., $(S_3 - S_4) \times P_2$ is in this instance smaller than the force, i.e., $S_2 \times P_1$, the sum of the force rightwardly moving the differential piston 3 and the force rightwardly moving the movable ring 8, which is necessary for rightwardly moving the differential piston 3. Consequently the differential piston 3 is maintained at the neutral position where the movable ring 8 is abutting to the shoulder 1a as well as to the flange portion 3b, as shown in FIG. 2.

The two pistons and two compression springs 36, 37 within the master cylinder 30 are generally identical to each other, and the pressure of braking-fluid produced in the rear cylinder 31 is equal to that produced in the front cylinder 32. As a result of this, the pressure $P_1$ in the first piston chamber 7a will be approximately identical to that $P_2$ in the second piston chamber 7c while the brake system is normally operating. For that purpose the cross-sectional area of each portion shall be determined to satisfy the following formula, $S_2 < (S_3 - S_4) < S_1$. In the above description the sliding resistance of sealing rings and others is neglected in order to simplify the problem; the sliding resistance actually exists, to some extent, to retain the differential piston 3 at its neutral position while the brake is not operated.

In the actual use of the valve constructed like the above description, the plug 4 is located in the front and the plug 16 in the rear; the whole of the valve is installed in a suitable place of a vehicle so that it may be downwardly inclined from front to rear. The port 18 is communicated by way of the conduit 38, through a residual pressure valve (pressure holding valve) 42, to the rear cylinder 31 in the master cylinder 30; the port 14 is communicated by way of the conduit 40 to the rear wheel cylinders 35; and the port 15 is communicated by way of the conduit 41 to the front wheel cylinders 34. The residual pressure valve 42, a combination of a check valve and a choke, is inserted with the object of maintaining some amount of pressure of the braking-fluid in the brake system for a short duration of time even after the return of the brake pedal 33. While the whole brake system operates normally the differential piston 3 maintains itself at the neutral position as shown in FIG. 1, and the ball 2 is also stationed at the lowest place in abutment with the end surface of the differential piston 3.

When the brake pedal 33 is depressed, the braking-fluid in the rear cylinder 31 of the master cylinder 30 is sent under pressure, via conduit 38, port 18, ball containing chamber 5, port 19, and conduit 40, to the rear wheel cylinders 35; and at the same time, the braking-fluid in the front cylinder 32 is similarly sent under pressure, via conduit 39, port 14, valve chamber 7d, second piston chamber 7c, port 15, and conduit 41, to the front wheel cylinders 34, resulting in the actuation of the rear/front brakes to effect the deceleration of the vehicle.

While the deceleration rate of the vehicle is relatively low the ball 2 maintains its position shown in FIG. 1 and the braking-fluid can freely flow to the rear wheel cylinders 35, that is the pressure of the braking-fluid in the rear cylinder 31 of the master cylinder 30 is delivered as it is to the rear wheel cylinders 35. However, when the deceleration rate of the vehicle exceeds the predetermined value the ball 2 rolls up along the slope of ribs 5a formed on the inner surface of the ball containing chamber 5, with the moment of inertia, to closely contact to the valve seat 6 and thereby to block the port 19. The pressure within the rear wheel cylinders 35 can not thereafter rise regardless of rising of the pressure in the ball containing chamber 5, so that locking of the rear wheels caused by the nose diving of the vehicle can be prevented. Even when the deceleration rate of the vehicle exceeds the predetermined value, the path of the braking-fluid to the front wheel cylinders 34 is not affected at all because of maintenance of the differential piston 3 at the neutral position, so that the pressure in the front cylinder 32 can be delivered to the front wheel cylinders 34 as it is.

The above description is concerned with a case wherein the whole brake system is in normal operation. The way of operation of the device in accordance with this embodiment, in case of a breakdown in the conduit 40 leading to the rear wheel cylinders 35 or in the conduit 41 leading to the front wheel cylinders 34 or in some other places, will be stated hereunder.

I. A case wherein any trouble or breakdown takes place in the rear brake circuit including the conduit 40.

If there is any trouble in the rear brake circuit, the pressure $P_1$ in the first piston chamber 7a will be lower than $P_2$ in the second piston chamber 7c when the brake pedal is depressed, for the following reason. In spite of the depressing of the brake pedal 33 the pressure in the rear cylinder 31, communicated with the damaged circuit, can not rise while a braking-fluid pressure produced in the front cylinder 32, which corresponds to the difference between the repulsive force of the compression spring 36 and that of the compression spring 37, is delivered to the second piston chamber 7c via the conduit 39, since the repulsive force of a compression spring becomes larger in response to the increase of the compression amount thereof, as is well known, though the compression amount of the compression spring 36 is larger than that of the compression spring 37. As a result of this phenomenon, that is, rising of the pressure in the second piston chamber 7c without the rise of pressure in the first piston chamber 7a, the force leftwardly biasing the differential piston 3, $(S_3 - S_4) \times P_2$ will overcome the preventive force, that is the sum of frictional resistance and the axial component of the weight of ball 2 and differential piston 3, thereby to shift the differential piston 3 leftwards for pressing the ball 2 against the valve seat 6. Leakage of the braking-fluid in the rear cylinder will be thereby suspended, because the port 19 communicating with the damaged rear brake circuit has been blocked. This has made it possible to avoid the following dangerous condition, which would be inevitable without installing the device in accordance with this embodiment, that is, the brake can hardly be effective until the braking-fluid in the rear cylinder 31 has been completely exhausted or the brake effect appears only in the final stage of the pedal depressing stroke.

Another feature of the embodiment is an alarm or warning for the driver informing him of the occurrence of any trouble in the brake system. The plunger 10a of the switch 10, attached to the alarm means, projects, upon having been released of the larger-diametered portion of the cam portion 3c, to turn the switch 10 ON for actuating the alarm means, which means may be a conventional one including a warning lamp, a warning buzzer or others. When the brake pedal 33 is further deeply depressed, after the port 19 has been blocked by the ball 2, the pressure $P_1$ in the piston chamber 7a will be raised up to nearly the same value as that $P_2$ in the second piston chamber 7b to return the differential piston 3 to the neutral position. The ball 2 will, however, be continuously urged against the valve seat 6, due to the pressure $P_1$ in the ball containing chamber 5, to maintain the blockade state of the port 19. When the brake is operated again in the abovementioned condition, after the brake pedal 33 has been once returned, it is possible to produce sufficient pressure of the braking-fluid in the front cylinder 32 with a shorter stroke of the brake pedal 33 than usual. The reason therefor is that (a) the insertion of the residual pressure valve 42 between the conduit 38 and the rear cylinder 31 prevents the pressure in the ball containing chamber 5 from rapidly falling down, even when the brake pedal 33 has been returned, for maintaining the blockade state of the port 19, by means of keeping the ball 2 pressed to the valve seat 6 with the aid of the residual pressure in the ball containing chamber 5 until the second braking operation starts, and (b) the braking-fluid in the rear cylinder 31 does not flow out or escape during the second stroke of brake operation, resulting in the pressing out of braking-fluid in the front cylinder 32 by the front and rear pistons unitedly working in such a manner as if both were a rigidly bound unit. The pressure in the ball containing chamber 5 falls down, in a certain period of time after the brake pedal 33 has been released, to return the ball 2, being parted from the valve seat 6, to the original position.

Regarding the case in which the rear brake circuit has trouble, the merits of this embodiment can be summed up as follows:

1. in the first brake operation the effective brake stroke can be shortened in comparison with conventional cases wherein this embodiment of the present invention is not utilized, as described above in greater detail;

2. in the ensuing second and further brake operations, which are usually practiced, brake strokes will become remarkably shorter than in normal conditions wherein the whole brake system is in good order.

II. Another case wherein any trouble or breakdown takes place in the front brake circuit including the conduit 41.

In case of breakdown in the front brake circuit the pressure $P_2$ in the second piston chamber 7c becomes lower, by the same reason as in the case of breakdown in the rear brake circuit, than that $P_1$ in the first piston chamber 7a, to rightwardly shift the differential piston 3, which shifting renders the shut-off valve 3e fitted into the valve chamber 7d to block the path of the braking-fluid leading from the port 14, via the valve chamber 7d, to the port 15. A further flow of the braking-fluid to the broken-down brake circuit will be suspended.

Th switch 10 for the alarm means will be at the same time turned ON to actuate the conventional type alarm means for informing the driver of the trouble.

Although a further depressing of the brake pedal 33, after the blockade of the path of the braking-fluid to the front brake circuit, will raise the pressure in the valve chamber 7d, the differential piston 3 will remain in the rightwardly pressed state, because the pressure receiving area of the differential piston 3 (area of the annular clearance between the valve chamber 7d and the push-rod portion 3f) in the valve chamber 7d is much smaller than the sectional area $S_1$ of the first piston portion 3a. The push-rod 3f will naturally be maintained at the tip thereof in abutment with the base 16b of the cavity 16a formed in the plug 16.

In the first brake operation after the occurrence of a breakdown in the front brake circuit, an extreme extension of the effective pedalling stroke can therefore be prevented; and in the ensuing second and further brake operations the stroke of the brake pedal 33 can be maintained shorter than that in the normal state, because the flow of the braking-fluid to the front brake circuit will remain completely blocked and the braking-fluid in the front cylinder 32 will not be discharged.

The only difference observed, between the case in which the rear brake circuit is damaged and the case in which the front brake circuit is damaged, is that the differential piston 3 is automatically returned in the former case to the neutral position while not in the latter case. Consequently there is no need of returning the differential piston 3 to the original neutral position after having finished the repair of the damaged place in the former; however, in the latter it must be manually returned back to the neutral position by pushing at the right hand end thereof upon removing the plug 16 after the repair of the damaged place has been finished. Alternatively the differential piston 3 can be returned to the neutral position by depressing the brake pedal while the plug of the rear wheel cylinders is being loosened.

In a second embodiment shown in FIG. 3 the cam portion 3c is formed in a sharply stepped configuration, enabling the end surface of the plunger 10a of the switch 10 for the alarm means to abut therewith, to thereby retain the differential piston 3 in the leftwardly shifted state to urge the ball 2 against the valve seat 6, for preventing the same from returning to the neutral position. In this way a state can be perfectly maintained to prevent the braking-fluid from flowing to the damaged conduit. After having repaired the damaged place the differential piston 3 can be returned to the neutral position, being released from the retention by the plunger 10a, by loosening to a certain extent or removing the switch 10 for the alarm means and depressing the brake pedal 33. Upon clamping the switch 10 for the alarm means again the repair operation is completed. Since the embodiment intends to perfectly block the port 19 by preventing the differential piston 3 from returning by the plunger 10a, it is further preferable to make the valve seat 6 of a material large in coefficient of elasticity or to attach an elastic material to the end surface facing the ball 2 of the differential piston 3 for maintaining the ball 2 in close contact with the valve seat 6 even in case of a slight retraction or regress of the differential piston 3.

The movable element for preventing the differential piston 3 from returning to the neutral position, by means of engagement with the stepped portion thereof, is not necessarily limited to the plunger 10a of the switch 10 for the alarm means, as is described in this embodiment. It is of course permissible to dispose a movable element on the place exclusively intended for the purpose.

An essential portion of a third embodiment is shown in FIG. 4, which is different from the foregoing embodiments in that (a) the ball 2 and the plug 4 threaded into the end opening of the ball containing chamber 5 are made of magnetic material; (b) the plug 4 is made into an electromagnet by means of winding a coil 50 thereabout; and (c) the cam portion 3c is formed into a gradually expanding three-stepped configuration.

Figure 5:
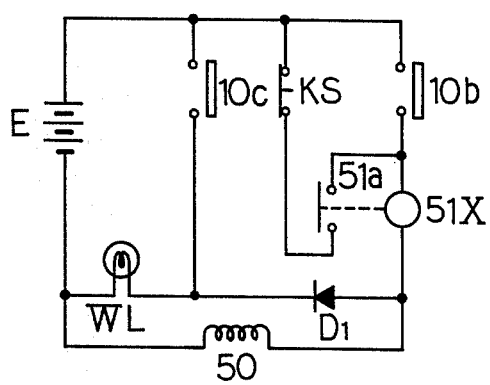
FIG. 5 is a chart of electric circuit in the device shown in FIG. 4.

An example of the electric circuit for regulating the current conducted to the coil 50 is shown in FIG. 5. Two contacts of the switch 10 for the alarm means are represented by 10b and 10c, which are regulated ON-OFF by the cam portion 3c of the differential piston 3.

First warning circuit, in which the contact 10b, a relay coil 51X, and a warning lamp WL are connected in series, and second warning circuit, in which the contact 10c and the warning lamp WL are connected in series, are connected in parallel to a battery E. A series circuit of the key switch KS of the vehicle and a normal open contact 51a of the relay is parallelly connected to the contact 10b. To the warning lamp WL of the first warning circuit is connected in parallel the coil 50 for energizing the plug 4. The diode $D_1$ is inserted with the object of preventing the coil 50 from being conducting when the second warning circuit is closed.

The way of operation of the embodiment described above will be explained as follows:

1. When the brake system is in a normal operation, the contacts 10b and 10c of the switch 10 for the alarm means are both in OFF state because of the differential piston 3 being retained stationary in the position shown in FIG. 4; consequently the warning lamp WL is not lit, and the plug 4 is not magnetized, either. Even when the deceleration rate of the vehicle exceeds the predetermined value to make the ball 2 closely contact to the valve seat 6 and thereby block the port 19 once, the ball 2 will be returned to the original position as the rate of deceleration falls.

2. When the ball 2 is closely pressed, due to a break down of the brake circuit, to the valve seat 6 by means of a leftward shifting in FIG. 4 of the differential piston 3, the ball 2 will be retained in a closely contacted state to the valve seat 6, even after the returning of the differential piston 3 to the neutral position. When the differential piston is leftwardly moved the contact 10b of the switch 10 for the alarm means is turned ON by the cam portion 3c not only to light the alarming lamp WL but also to magetize the plug 4 by the current in the coil 50 and thereby to continuously attract the ball 2 which has been pushed up to the vicinity of the plug 4 by the differential piston 3. Since the first warning circuit is formed as a so-called self-retaining circuit, if once the contact 10b be turned ON, it will be maintained in a closed circuit state irrespective of returning to the OFF state of the contact 10b. Returning of the differential piston 3 to the neutral position will not affect the state of attracting the ball 2 by the plug 4. The path of the braking-fluid to the damaged conduit is therefore completely shut off, and consequently the braking-fluid in that system of the master cylinder 30 will not be further discharged at all, resulting in making the brake pedalling stroke shorter than in normal state. It means that safe driving is assured in spite of the breakdown in one of the brake systems.

In this embodiment there is no need, in addition, of any special operation for returning the differential piston 3 or the ball 2 to the original position after the repair of the damaged place, because the differential piston 3 can automatically return to the neutral position, and the ball 2 will be automatically parted from the valve seat 6 only if the key switch KS of the vehicle is turned off to suspend the conduction to the coil 50.

3. When the conduit of the front brake system is broken down thereby to rightwardly shift the differential piston 3, the contact 10c of the switch 10 for the alarm means is turned ON by the cam portion 3c to light the warning lamp WL for informing the driver of the trouble. In this case the differential piston 3 is incapable of automatically returning to the neutral position; it must be, similarly to the previous embodiment, manually restored to the original position after the repair of the damaged place has been finished. Another feature of this embodiment is that the first warning circuit is open in this situation and consequently makes the coil 50 non-conductive; during a driving of the vehicle using the rear brake system only, even if the deceleration rate thereof exceeds the predetermined value to cause the ball 2 to closely contact the valve seat 6 once, it will not be attracted to be a captive of the plug 4 but will return to the original position as the rate of deceleration falls. It is preferable, in this embodiment, to manufacture all the parts except for the plug 4 and the ball 2, for example the differential piston 3 in particular, the valve casing 1, from non-magnetic material. Still another feature of this embodiment is that insertion of the residual pressure valve 42 in the circuit connecting the ball containing chamber 5 and the master cylinder 30 is not necessarily required, because the ball 2 is retained by the electromagnet (the plug 4).

Figure 6:
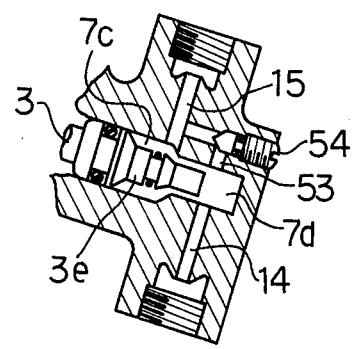
FIG. 6 is a vertical sectional view of an essential part of a fourth embodiment.

A fourth embodiment of this invention is shown in its essential part in FIG. 6, wherein means for restoring the differential piston 3 to the original position, which has been rightwardly shifted due to a breakdown in the front brake circuit to block the path of the braking-fluid, is different from those in the foregoing embodiments. Although no difference is observed in that the differential piston 3 is rightwardly shifted, due to a breakdown in the front brake circuit, connected to the port 15 for causing the shut-off valve 3e to fit into the valve chamber 7d to block the path of the braking-fluid leading from the port 14, via the valve chamber 7d and the second piston chamber 7c, to the port 15, this embodiment is featured in that it is provided with a by-pass 53 for the abovementioned path of the braking-fluid, which is capable of communicating with the port 14 and the port 15 even while the shut-off valve 3e is being fitted into the valve chamber 7d. The by-pass 53 is normally closed by a valve or a screw plug 54; however, when the screw plug 54 is opened after the repair of the damaged place in the conduit, and then the brake is operated, the pressure of the braking-fluid is transmitted not only to the valve chamber 7d but also through the by-pass 53 to the second piston chamber 7c, for producing a larger force therein to urge the differential piston 3 leftwardly (the product of the sectional area $S_3$ of the second piston chamber 7c and the pressure $P_2$ in the second piston chamber 7c) than the force urging the differential piston 3 rightwardly (the product of the sectional area $S_1$ of the first piston portion 3a and the pressure $P_1$ in the first piston chamber 7a), with the result of restoring the differential piston 3 to the neutral position. With the screw plug 54 being returned to the closed position, the repair operation is finished.

Figure 7:
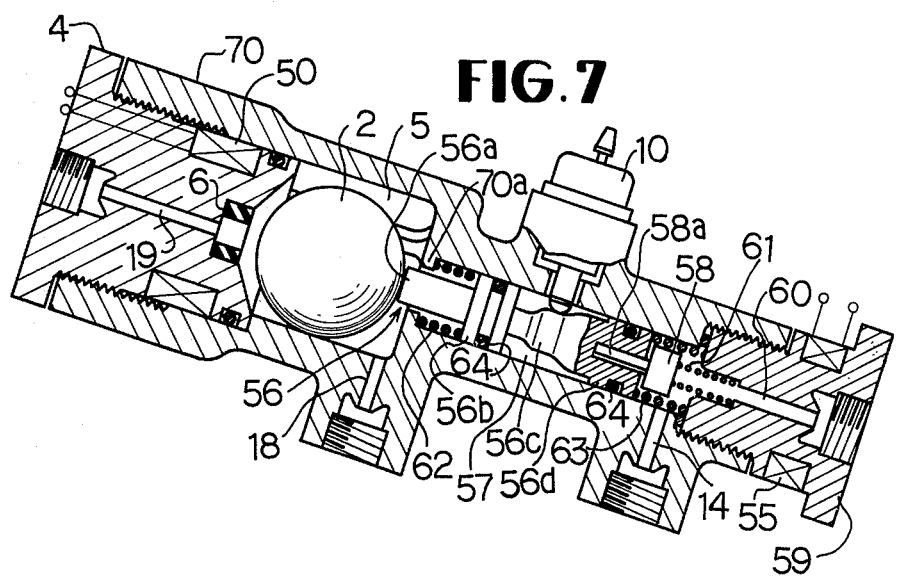
FIG. 7 is a longitudinal vertical sectional view of an essential part of a fifth embodiment.

A fifth embodiment is shown in FIG. 7, whose left half, that is the gravity valve side, is similar in construction to the aforementioned embodiment thereby needing no illustration; only the right half which is the differential valve side, will be described hereunder.

A differential piston 56 accommodated in a differential piston containing chamber 57 which is in communication with the ball containing chamber 5 is composed of, from left to right in order, a ball-push-rod portion 56a, a first piston portion 56b, a cam portion 56c, and a second piston portion 56d, both piston portions being of identical diameter and being respectively fitted thereabout a sealing ring 64 on the outer periphery for retaining fluid tightness between the same and the valve casing 70. In a bore, formed in the end surface of the differential piston 56 on the right side in FIG. 7, is slidably fitted a leg or stem 58a of a valve poppet 58, a part of outer periphery of which stem being cut away parallelly in axial direction for forming a path of the braking-fluid flowing in and out when the stem 58a axially slides therein. The valve poppet 58 is made of magnetic material.

In the end opening of the valve casing 70 on the differential valve side is a plug threaded 59, which is made of magnetic material, having a port 60 of a stepped bore configuration which passes through the central part thereof. In addition a coil is wound on the periphery of plug 59. Around the larger-diametered portion of the port 60 is fitted a compression spring 61 which constantly urges the valve poppet 58 retained by the differential piston 56 toward the same.

Between the first piston portion 56b of the differential piston 56 and a radial shoulder 70a of the valve casing 70, and between the second piston portion 56d and the plug 59, are respectively disposed a compression spring 62 and 63 which will retain the differential piston 56 in the neutral position.

Similarly to the previous embodiment the plunger 10a of the switch 10 for the alarm means abuts on the cam portion 56c of the differential piston 56.

Figure 8:
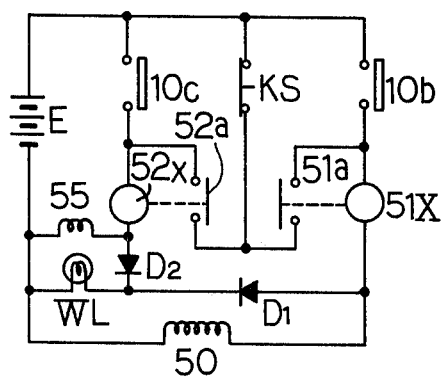
FIG. 8 is a chart of electric circuit in the device shown in FIG. 7.

An electric circuit including the switch 10 for the alarm means, the coil 50, the coil 55, etc. is illustrated in FIG. 8. The connection of the first warning circuit including the contact 10b of the switch 10 for the alarm means, the relay coil 51X, the warning lamp WL, etc., and the coil 50 is identical to that of the previous embodiment. Different points as compared to the previous embodiment can be seen in that the second warning circuit, including the contact 10c, the warning lamp WL etc., is formed as a circuit of self-retaining type, and that the coil 55 is parallelly connected to the warning lamp WL and the conduction to the coil 55 is prevented, when the first warning circuit is closed, by means of a diode $D_2$ inserted.

In a device described above, when the rear brake circuit connected to the port 19 is damaged, the differential piston 56 is leftwardly shifted, due to the pressure difference between the first piston chamber and the second piston chamber, to urge the ball 2 against the valve seat 6 for blocking the path of the braking-fluid to the damaged rear brake circuit. The contact 10b is simultaneously turned ON to close the first warning circuit, which results in lightening of the warning lamp WL and conduction of the current to the coil 50 for magnetizing the plug 4; the ball 2 will thereby be attracted by the plug 4 to be held thereat. When the brake pedal is released in this condition the differential piston 56 will be restored to the neutral position by virtue of the compression spring 62 and the contact 10b will be turned OFF. The first warning circuit, however, is to be maintained in the closed state, and the plug 4 is also maintained in the magnetized state to hold the attracted ball 2. As soon as the key switch KS of the vehicle is turned off the first warning circuit will be opened and the plug 4 will lose the magnetism to effect the return of the ball 2 to the original position.

When the front brake circuit connected to the port 60 is damaged, a brake operation will effect then rightward shifting of the differential piston 56 due to the pressure difference to urge the valve poppet 58 against the valve seat 59a, formed on the end surface of the plug 59, and thereby to block the port 60. The contact 10c of the switch 10 for the alarm means will be simultaneously turned ON to close the second warning circuit. As a result of this the warning lamp WL is lit and the coil 55 is energized to magnetize the plug 59 and thereby to attract the valve poppet 58 for holding the same. Releasing of the brake pedal in this situation removes the pressure difference between the opposite sides of the differential piston 56 for effecting the restoration of the same to the neutral position by virtue of the elasticity of the compression spring 63. However, the self-retaining function of the second warning circuit makes the plug 59 maintain the magnetism and thereby hold the valve poppet 58 as it is. As soon as the key switch KS of the vehicle is turned off the valve poppet 58 will be pressed back by virtue of the elasticity of the compression spring 61 toward the differential piston 56 to open the port 60.

In this embodiment the very first brake pedalling is capable of perfect blocking of the braking-fluid path to the damaged conduit, regardless of the breakdown position being in either of both the rear brake system and the front brake system. Consequently, at the ensuing second or later pedalling operations the braking-fluid in the section of master cylinder which is communicated to the damaged conduit will not flow out or escape at all, which serves in shortening the brake stroke as compared with that in the normal state, and thereby assures the safer brake operation. Further advantages resides in that, because of automatically restoring to the neutral position of the differential piston 56 and of automatically returning to the original position of the ball 2 and the valve poppet 58 due to OFF operation of the vehicle key switch KS, no special manual operation for restoring to the original position of the differential piston 56, the ball 2, and the valve poppet 58, after the repair of the damaged place, is required.

It is preferable to make the parts of the device, in this embodiment, in particular the differential piston 56, the valve casing 70, etc., from non-magnetic material, with the exception of the plug 4, the ball 2, the valve poppet 58, and the plug 59.

Regarding the plug 4 and the plug 59, magnetization of the whole body is not necessary; a small electromagnet separately made may be imbedded respectively in the central part thereof.

Summarizing the abovementioned description, the object of this invention is to provide a safety device for use in a hydraulic brake for the vehicles, that is a valve inserted in the hydraulic pressure circuit connecting the tandem type master cylinder for the vehicle hydraulic brake and the rear/front wheel cylinders, which valve comprising (a) a valve casing; (b) a ball containing chamber, formed in the valve casing, constituting a part of the hydraulic pressure circuit to the rear wheel cylinders; (c) a ball accommodated in the ball containing chamber, and rolling up along a slope, when the deceleration rate of the vehicle exceeds the predetermined value, to closely contact to a valve seat for blocking the braking-fluid path to the rear brake circuit; (d) a differential piston containing chamber disposed in communication with the ball containing chamber; and (e) a differential piston axially slidably fitted in the differential piston containing chamber and being, on either end surface, subjected to hydraulic pressure of the rear brake circuit and the front brake circuit, wherein the former brake circuit, is damaged it is slidden toward the ball, by virtue of the pressure difference between the two circuits, to press the ball against the valve seat, and when the latter circuit is damaged it is slidden in the reverse direction similarly due to the pressure difference to block the braking-fluid path to the front brake circuit. The advantageous effects of this invention may be summed up as follows: the function of a gravity valve and that of a differential valve may be integrated in a single valve; a gravity valve can be utilized, in addition to the original purpose, as a shut-off valve of a differential valve; joint members which would be required when the gravity valve and the differential valve were separately manufactured may be eliminated; chance of leakage of the braking-fluid can be minimized by virtue of decreasing the joints; and the space needed for the installation of the safety device can be minimized.

It will be obvious to those skilled in the art that various changes may be made without departing from the scope of the invention and the invention is not to be considered limited to what is shown in the drawings and described in the specification.

What is claimed is:

1. A safety device for use in a vehicle hydraulic brake comprising:
    a. a valve casing installed in a hydraulic circuit interconnecting the tandem type master cylinder for the vehicle hydraulic brake and the front/rear wheel cylinders;
    b. a ball-containing-chamber formed within said valve casing to serve as a part of the hydraulic circuit communicating to said rear wheel cylinders;
    c. a ball accommodated in said ball-containing-chamber adapted to shut off the path of braking-fluid to the rear brake circuit, when the vehicle deceleration rate exceeds a predetermined value, by means of rolling up along a slope due to inertia to closely contact a valve seat;
    d. a differential-piston-containing-chamber disposed in communication with said ball-containing-chamber; and
    e. a differential piston axially movably fitted within said differential-piston-containing-chamber to receive on opposite ends thereof respectively the hydraulic pressure from the rear brake circuit and the front brake circuit, wherein when the rear brake circuit is damaged or broken down, said piston slides toward said ball to urge the same against said valve seat due to the difference of pressure in both circuits, and when the front brake circuit is broken down, said piston slides in the reverse direction similarly due to the difference of pressure to shut off the path of the braking-fluid to the front brake circuit.

2. A safety device as set forth in claim 1, wherein:
    a. said differential piston has a pair of piston portions on opposite ends thereof, a first piston portion thereof being accommodated in a piston-containing-chamber having a larger diameter than that of the same; further comprising
    b. at least one, having fluid-tightness retaining means, axially movably fitted on said first piston portion in a cylindrical space formed between the same and the inner surface of said piston-containing-chamber, wherein either of said first piston portion and said piston-containing-chamber is provided with a radial stepped portion for preventing said at least one ring from sliding in the direction of a second piston portion beyond a predetermined position.

3. A safety device as set forth in claim 1, wherein said differential piston is retained in the neutral position by virtue of the elasticity of a spring or spring members.

4. A safety device as set forth in claim 1, wherein a shut-off valve plunger for blocking the path of the braking-fluid to said front brake circuit is integrally secured to said differential piston.

5. A safety device as set forth in claim 4, wherein one end of said differential piston is provided with a push-rod portion secured on said end surface and projecting through the end wall of said valve casing, and said differential piston is adapted to be returned to the neutral position by being pressed at the tip thereof.

6. A safety device as set forth in claim 4 further comprising a valve casing having a by-pass, in addition to a path of the braking-fluid ranging from a port communicated with the master cylinder to, via said shut-off valve, a port communicated with the front wheel cylinders, said by-pass fluidly connecting both ports without passing said shut-off valve, wherein said by-pass is midway provided with a manually operable valve means.

7. A safety device as set forth in claim 1 wherein said differential piston is provided with a sharply stepped portion on a part of the outer periphery thereof and a movable member on said valve casing, being urged on the larger-diametered portion of said sharply stepped portion, wherein when said differential piston is shifted from the neutral position said movable member is released from the contact with said larger-diametered portion to engage with the radial surface of said sharply stepped portion of the differential piston for preventing said differential piston from returning to the neutral position.

8. A safety device as set forth in claim 1 further comprising a valve casing provided with a switch for an alarm means and a cam portion disposed on said differential piston for actuating said switch.

9. A safety device as set forth in claim 1 wherein said ball and a member or members in the vicinity of said valve seat are both made of magnetic material, said member or members being wound with a coil, and an electric circuit for maintaining the conduction to said coil after the pressing of said ball against said valve seat by said differential piston has once been started.

10. A safety device as set forth in claim 1 further comprising a poppet valve for blocking the path of the braking-fluid to the front brake circuit, slidably attached to said differential piston, at least one member in the vicinity of the valve seat of said shut-off valve, both made of magnetic material, said members being wound with a coil, and an electric circuit for maintaining the conduction to the coil after the pressing of said valve poppet against said valve seat by said differential piston has once been started.

* * * * *